United States Patent
Krautter et al.

(10) Patent No.: US 7,471,212 B2
(45) Date of Patent: Dec. 30, 2008

(54) METHOD AND DEVICE FOR GUIDING A VEHICLE, AS WELL AS A CORRESPONDING COMPUTER PROGRAM AND A CORRESPONDING COMPUTER-READABLE STORAGE MEDIUM

(75) Inventors: Wolfgang Krautter, Stuttgart (DE); Dietrich Manstetten, Ehningen (DE); Bilge Manga, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 11/357,250

(22) Filed: Feb. 17, 2006

(65) Prior Publication Data

US 2006/0220913 A1 Oct. 5, 2006

(30) Foreign Application Priority Data

Mar. 17, 2005 (DE) ........................ 10 2005 012 269

(51) Int. Cl.
| | |
|---|---|
| B60Q 1/00 | (2006.01) |
| G08G 1/00 | (2006.01) |
| G08G 1/16 | (2006.01) |
| G08G 1/09 | (2006.01) |
| G08G 1/01 | (2006.01) |
| G08G 1/04 | (2006.01) |
| G08G 1/123 | (2006.01) |
| G01C 22/00 | (2006.01) |
| G01C 21/00 | (2006.01) |
| G05D 1/02 | (2006.01) |

(52) U.S. Cl. ........................ 340/901; 340/903; 340/905; 340/933; 340/943; 340/995.1; 340/995.13; 340/995.19; 340/435; 701/23; 701/24; 701/25; 701/26; 701/27; 701/207; 701/209; 701/226; 701/300; 701/302

(58) Field of Classification Search ......... 340/933–943, 340/995.1, 995.13, 995.19, 903, 905, 435; 701/23–27, 207, 209–226, 300–302
See application file for complete search history.

(56) References Cited

U.S. PATENT DOCUMENTS

| | | | | |
|---|---|---|---|---|
| 5,771,007 | A * | 6/1998 | Arai et al. .................... | 340/903 |
| 5,862,509 | A * | 1/1999 | Desai et al. .................. | 701/209 |
| 6,151,539 | A * | 11/2000 | Bergholz et al. .............. | 701/25 |
| 6,298,302 | B2 * | 10/2001 | Walgers et al. ............... | 701/209 |
| 6,778,903 | B2 * | 8/2004 | Robinson et al. ............. | 701/209 |
| 6,944,538 | B2 * | 9/2005 | Ishibashi et al. ............. | 701/209 |
| 7,177,748 | B2 * | 2/2007 | Irion et al. .................... | 701/93 |
| 7,224,290 | B2 * | 5/2007 | Takenaga et al. ............. | 340/907 |
| 2003/0074131 | A1* | 4/2003 | Barkowski et al. ........... | 701/200 |
| 2007/0150182 | A1* | 6/2007 | Okusa ......................... | 701/209 |

* cited by examiner

*Primary Examiner*—Benjamin C Lee
*Assistant Examiner*—Lam P Pham
(74) *Attorney, Agent, or Firm*—Kenyon & Kenyon LLP

(57) ABSTRACT

A method and a system for guiding a vehicle are provided, which utilize information regarding the vehicle's position. The position of the vehicle is ascertained exactly to the correct lane, and for at least a part of the traffic lanes of specifiable traffic routes in the surroundings of the vehicle, the traffic situation is ascertained. An estimation of traffic lanes is undertaken in the light of specifiable criteria by the evaluation of the vehicle's position and the traffic situation, thereby enabling the driver to select the most favorable lane in terms of desired criteria, e.g., minimizing lane changes, minimizing travel time, etc.

22 Claims, 1 Drawing Sheet

METHOD AND DEVICE FOR GUIDING A VEHICLE, AS WELL AS A CORRESPONDING COMPUTER PROGRAM AND A CORRESPONDING COMPUTER-READABLE STORAGE MEDIUM

FIELD OF THE INVENTION

The present invention relates to a method and a device for guiding a vehicle using information concerning the vehicle position, as well as a corresponding computer program and a corresponding computer-readable storage medium usable in connection with a vehicle navigation system in order to increase driving safety and driving comfort.

BACKGROUND INFORMATION

Algorithms are known for estimating the traffic density and for warning of traffic jams or for the detection of disturbances in the road traffic. These algorithms process stationary and/or non-stationary traffic data which have been gathered, for instance, via measuring loops embedded in the roadway or measurements in individual vehicles. In individual vehicles, for instance, data on the distance from preceding vehicles or following vehicles are ascertained with the aid of measuring devices of an intelligent clearance-regulating cruise control or a so-called ACC (adaptive cruise control) system, or the speed of one's own vehicle is recorded, etc. Such algorithms for evaluating the traffic situation are usually used in master traffic control stations, but they may also be used directly in the on-board computer of a vehicle for processing these data. The development of vehicle-to-vehicle communications makes possible the exchange of the data in this connection, which are necessary for such calculations. Besides such central systems for recording the traffic situation, vehicle navigation systems are known which are able to determine the current position of the vehicle with great accuracy, which systems are usually linked to satellites.

Design approaches are also known which are designated as lane assistants which, with the aid of sensors, monitor the tracking of a vehicle, and notify the driver when the vehicle leaves a traffic lane it has once used. This prevents the vehicle from undesirably getting away from the traffic lane.

However, up to now, the known systems have been used only for traffic monitoring, but not for lane optimization. A lane change maneuver in dense road traffic always means a loss in safety, and therewith an additional stress situation for the vehicle's driver and his surroundings.

SUMMARY OF THE INVENTION

An object of the present invention is to make available a method and a device for guiding a vehicle while using information concerning the driving position, as well as a corresponding computer program and a corresponding computer-readable storage medium, which eliminate the disadvantages of the known design approaches and increase traffic safety and traffic flow.

The method according to the present invention, for guiding a vehicle while using information concerning the vehicle position, offers the advantage that the traffic flow is generally improved and that the accident risk is reduced. Because the position of the vehicle is ascertained exactly to the correct lane, and for at least a part of the specifiable traffic lanes of the traffic paths in the surroundings of the vehicle the traffic situation is ascertained, and, in the light of specifiable criteria, by evaluating the vehicle position and the traffic situation, an estimation is made of the traffic lanes, it is made possible by using suitable criteria, such as average speed, to ascertain the most favorable traffic lane for a specifiable time period. If the traffic situation does not change over this time period, no lane change is necessary in the ideal case. However, in any case, the number of lane changes is considerably reduced compared to the conventional design approaches.

In one example implementation of the method according to the present invention, it is provided that, in addition to the information concerning the vehicle's position, information concerning the destination of the vehicle is also used, and for at least a part of the traffic lanes between the vehicle's position and the vehicle's destination the traffic situation is ascertained, and an evaluation (or estimation) of the traffic lanes is undertaken in the light of specifiable criteria, by the evaluation of the destination, the vehicle's position and the traffic situation.

As a criterion for the evaluation of the traffic lanes, besides the travel time to a specifiable destination, the number of lane changes that are to be carried out may also be specified. In this context, it is advantageous if a lane change is proposed automatically as a function of the estimation of the traffic lanes. In one example approach, it is provided, in this context, that the estimation of the travel lanes and/or proposals for lane change be output acoustically and/or optically. A particularly advantageous use of the method according to the present invention is that the vehicle's navigation system is broadened by a function for estimating the travel lanes.

In one example implementation of the method according to the present invention, it is provided that the estimation of the travel lanes is undertaken using a data processing device, a central data processing device and/or a data processing device installed in the vehicle.

In another example implementation of the method according to the present invention, it is provided that the traffic situation is ascertained by evaluating stationary and/or non-stationary traffic data, stationary traffic data being gathered, for example, by measuring loops installed in the vicinity of traffic lanes. In parallel or alternatively to this, non-stationary traffic data may be gathered by measurements in individual vehicles. It is advantageous in this context if measuring devices of an intelligent distance control cruise control are utilized to provide the ascertainment of distance data and/or one's own speed as the measurements of non-stationary traffic data in individual vehicles. In particular, the vehicle's position with respect to the travel lane is able to be measured accurately via a global positioning system (GPS), by video evaluation, by electronic maps and/or by measuring loops installed in the vicinity of travel lanes.

An additional example implementation of the method according to the present invention provides that at least a part of the data required for the estimation of the travel lanes is exchanged between the vehicle and a master station and/or between different vehicles.

An example device according to the present invention for guiding a vehicle while using information on the vehicle's position includes: means for ascertaining the position of the vehicle; means for ascertaining the traffic situation; means for data input and/or output; and means for storing data. The example device further includes means for estimating travel lanes, and the arrangement is designed in such a way that the following operations are able to be carried out by evaluating the position of the vehicle and the traffic situation in the light of specifiable criteria: accurate ascertainment of the position of the vehicle with respect to the travel lane; the ascertainment of the traffic situation for at least a part of the traffic lanes of the specifiable traffic paths in the surroundings of the vehicle; and the estimation of traffic lanes.

One example embodiment of the device according to the present invention provides that the means for ascertaining the position of the vehicle includes: a global positioning system (GPS); means for data exchange having measuring loops and/or electronic maps; means for ascertaining the traffic situation; means for data exchange with at least one traffic master station; an intelligent clearance control cruise control; means for vehicle-to-vehicle communication; and/or a video monitoring system. In addition, the means for data input and/or data output may have at least one interface for the following: vehicle-to-vehicle communication; data exchange with a global positioning system (GPS) and/or with at least one traffic master station; sensors; an acoustical and/or optical data output; and/or the manual and/or acoustical data input.

It is advantageous if the device according to the present invention is coupled to a vehicle navigation system.

For the processing of data in individual vehicles themselves, the present invention provides that the device for guiding a vehicle includes an onboard computer.

A computer program for guiding a vehicle, while using information regarding the vehicle position, makes it possible for a data processing device to carry out a method for guiding a vehicle, after the program has been loaded into the memory of the data processing device. The position of the vehicle is ascertained accurately as to the traffic lane, and the traffic situation is ascertained for at least a part of the traffic lanes of specifiable traffic paths in the surroundings of the vehicle. An estimation of the traffic lanes is undertaken with the aid of specifiable criteria by the evaluation of vehicle position and traffic situation.

Such computer programs may, for example, be made available downloadable in a data or communications network (for a fee or gratis, and freely accessible or password-protected). A computer program according to the present invention may thus be downloaded from an electronic data network, such as the Internet, to a data processing device connected to the data network.

In order to carry out the method according to the present invention for guiding a vehicle, it is provided to install a computer-readable storage medium on which a program is stored, which program makes it possible for a data processing device to carry out a method for guiding a vehicle, while using information on the vehicle's position. The position of the vehicle is ascertained accurately with respect to the traffic lane, and the traffic situation is ascertained for at least a part of the traffic lanes of specifiable traffic paths in the surroundings of the vehicle. An estimation of the traffic lanes is undertaken with the aid of specifiable criteria by the evaluation of the vehicle position and the traffic situation.

The computer program according to the present invention and the computer-readable storage medium according to the present invention may be broadened by program code sections, in order to make it possible to execute particularly advantageous example implementations of the method according to the present invention. For instance, the broadening may consist in evaluating the travel destination in addition to the vehicle's position, and, in the light of this information, to ascertain for at least a part of the travel lanes the traffic situation between the vehicle's position and the destination of the vehicle, and, in the light of specifiable criteria, to undertake an estimation of the travel lanes by evaluating the travel destination, the vehicle's position and the traffic situation.

The present invention provides the driver of a vehicle with information regarding which lane is the "fastest travel lane" for a specified time period, that is, the lane having the shortest travel time. These data offer the advantage that the driver is pointed towards the most favorable traffic lane, so that unnecessary lane changes are avoided, because in a meaningful way, only those lane changes that are suggested by the system have to be carried out.

Several advantages result from the present invention, both for the driver of the controlled vehicle and the surrounding overall traffic. First, the accident risk for the driver and his immediate surroundings is reduced by the avoidance of unnecessary lane changes. Second, the driver has the chance of shortening his travel time by following the suggestions. Third, the present invention offers the driver additional comfort, because the driver has to worry less about his manner of driving during the trip, and the driver gets into fewer stressful situations caused by lane changes. In addition, the traffic flow and the traffic efficiency are improved, because too many lane changes affect the overall traffic negatively, and, by making the traffic lane recommendations, the present invention contributes to decrease in the number of lane changes.

DETAILED DESCRIPTION

Figure 1:
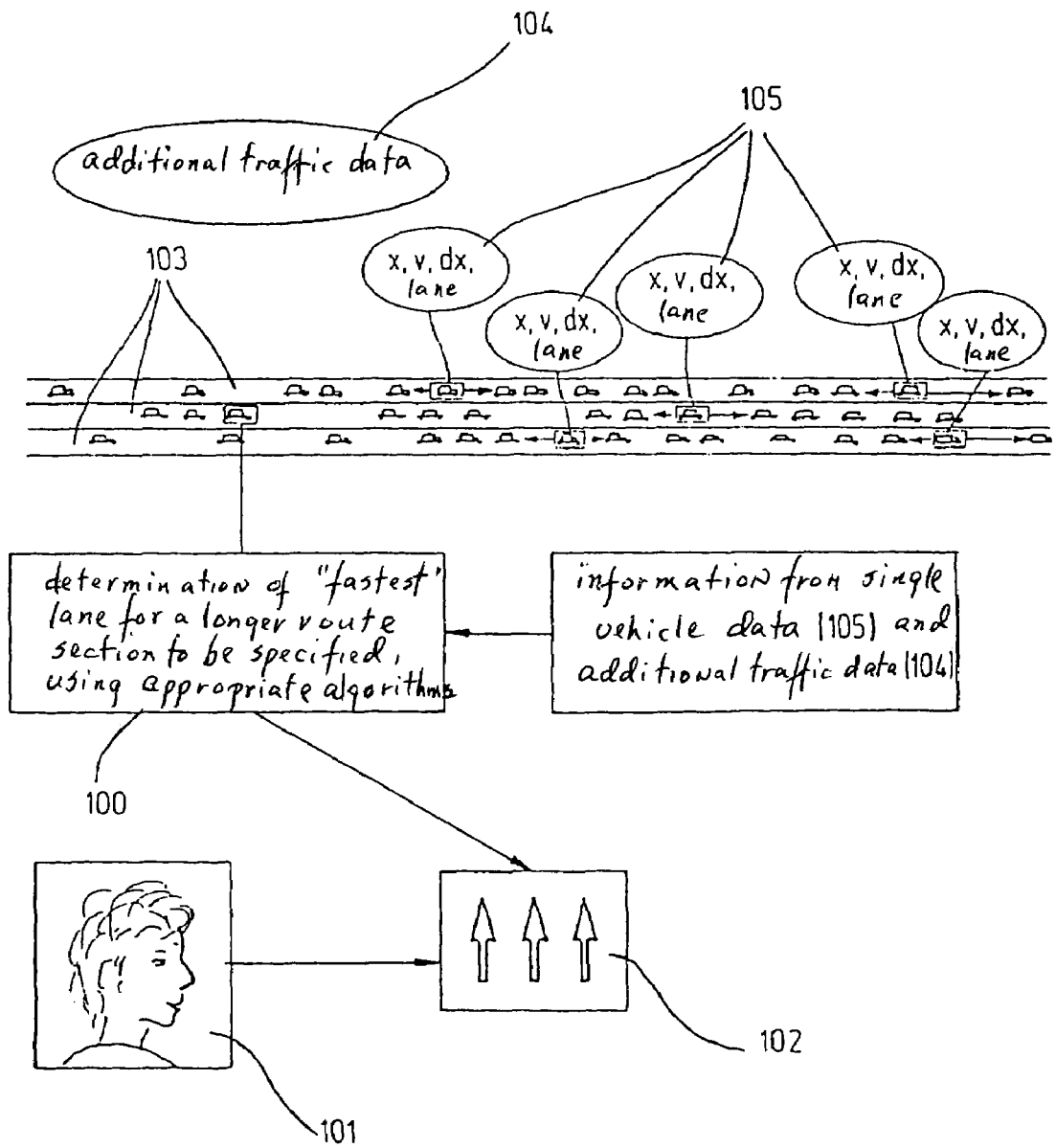
FIG. 1 shows a schematic representation of an example implementation of the method according to the present invention, taking into consideration data gathered in the vehicle and additional data regarding the traffic situation.

In an example embodiment of the present invention, the conventional vehicle navigation system is improved by providing a functional implementation which will be designated from here on as lane recommendation assistant 100. Besides the usual pointers or information made available by vehicle navigation systems concerning travel direction changes, junctions, intersections and the like, the present invention provides the driver 101 with pointers or information on the selection of his traffic lane 103, visually via a display unit 102 and/or acoustically. These pointers are based on the determination of the "fastest" lane for a longer route section, that is to be defined, via corresponding algorithms, and are based not only on the necessity of filing into a certain traffic lane 103 in order to be able to undertake the provided travel direction change as ascertained by the vehicle navigation system, as is already made available by conventional vehicle navigation systems, but rather, the pointers are based on the evaluation of the traffic situation while using additional traffic data 104 and/or of data 105 gathered in the single vehicle, as are supplied, for instance, by ACC systems. In addition, the present invention further enables the estimation of traffic lanes 103 with respect to specifiable criteria, such as travel time that is as short as possible.

A lane optimization while using the present invention may be carried out in different implementations. If one knows the travel route, so that no navigation unit is required, lane recommendation assistant 100 may be used as an information system, which informs generally about the traffic situation in the surroundings of the vehicle, in that it gives information on the lane situation on the road just traveled. This information is possible without an evaluation of a travel destination. The selection of the suitable lane for reaching a certain destination is then left to the driver, without his having explicitly to input the destination into a navigation system.

A lane-referred recording of the traffic data is required for a correct estimation of traffic lanes (103). This may be implemented via an automatic traffic lane detection, which is either able to be carried out via video evaluation or highly accurate GPS and electronic maps. Besides the use of data which are principally used by master traffic control stations (such as loop data), it is also possible, by exact position determination internal to the vehicle, to carry out lane-referred computations in the single vehicle and to record lane-referred data. The evaluation of these data with regard to determining traffic lane 103 (for instance, the one having the least travel time) takes place in this case by suitable algorithms in the onboard computer.

The pointers with regard to the favorable traffic lane 103 may be output in various ways, for instance, optically, acoustically or as a voice output. In one example embodiment, it is provided that the estimation or the pointers on traffic lanes 103 should be output only optically, with the driver having the option of deciding whether he wishes to obtain such information. In this example embodiment, the system of the present invention makes no undesired suggestions, but only affects positively the comfort of the driver.

The data required for the computation of the lane recommendation may, for instance, be made available via vehicle-to-vehicle communications, but also by a master traffic control station. The recording of data takes place either by measurements in single vehicles or via stationary measuring loops. For the lane-related measurement, a lane detection is required which may be implemented either via a video evaluation or via electronic maps and highly accurate GPS. The data 105 that are gathered in the single vehicle may, for instance, include distances from other vehicles "dx", one's own speed "v", speeds of the vehicles in the immediate surroundings of the measuring vehicle, the positioning, on the one hand, related to the route section "x", and on the other hand, related to traffic lane 103 "lane", etc.

The present invention is not limited to the exemplary embodiment stated above. Rather, a number of variants are conceivable which make use of the system according to the present invention and the method according to the present invention without departing from the fundamental concept of the present invention.

What is claimed is:

1. A method for automated guidance of a vehicle, comprising:
    ascertaining a position information regarding the vehicle, wherein the position information includes identification of a traffic lane in which the vehicle is traveling among a plurality of traffic lanes on a road;
    ascertaining a traffic situation for at least some of the plurality of traffic lanes within a specified travel route for the vehicle, the at least some of the plurality of traffic lanes including the traffic lane in which the vehicle is traveling;
    evaluating the at least some of the plurality of traffic lanes using at least one specified evaluation criterion, the position information of the vehicle, and the ascertained traffic situation; and
    determining, based upon the evaluation, a lane having a shortest travel time, wherein unnecessary lane changes are avoided.

2. The method as recited in claim 1, wherein the evaluating of the at least some of the plurality of traffic lanes further takes into account information on a destination of the vehicle, and wherein the traffic situation is ascertained for at least a portion of the specified travel route between the vehicle's ascertained position and the destination of the vehicle.

3. The method as recited in claim 2, wherein the evaluating of the at least some of the plurality of traffic lanes is performed using a data processing system.

4. The method as recited in claim 3, wherein the data processing system includes at least one of a central data processing device external to the vehicle and a data processing device installed in the vehicle.

5. The method as recited in claim 4, wherein the traffic situation is ascertained by evaluating at least one of stationary and non-stationary traffic data.

6. The method as recited in claim 5, wherein the stationary traffic data are obtained by measuring loops installed in the vicinity of the plurality of traffic lanes.

7. The method as recited in claim 5, wherein the non-stationary traffic data are obtained by measurements in at least one of the vehicle and other vehicles.

8. The method as recited in claim 7, wherein the non-stationary traffic data are measured by at least one measuring device of an intelligent distance-regulating cruise control system, wherein the non-stationary traffic data include the vehicle's own speed and a distance between the vehicle and a preceding vehicle.

9. The method as recited in claim 2, wherein the position information regarding the vehicle is ascertained by using at least one of a global positioning system, video evaluation, electronic maps, and data obtained by measuring loops installed in the vicinity of the plurality of traffic lanes.

10. The method as recited in claim 2, wherein at least a portion of data used in the evaluating of the at least some of the plurality of traffic lanes is exchanged between the vehicle and at least one of a master traffic control station and another vehicle.

11. The method as recited in claim 2, wherein the at least one specified evaluation criterion includes at least one of a travel time to the destination and a number of lane changes to be carried out.

12. The method as recited in claim 1, further comprising:
    automatically providing a lane change prompt to the driver as a function of the evaluation of the at least some of the plurality of traffic lanes.

13. The method as recited in claim 2, further comprising:
    automatically providing a lane change prompt to the driver as a function of the evaluation of the at least some of the plurality of traffic lanes.

14. The method as recited in claim 12, wherein at least one of a result of the evaluation and the lane change prompt is emitted at least one of acoustically and optically.

15. A system for guiding a vehicle, comprising:
    a means for ascertaining a position information regarding the vehicle, wherein the position information includes identification of a traffic lane in which the vehicle is traveling among a plurality of traffic lanes on a road;
    a means for ascertaining a traffic situation for at least some of the plurality of traffic lanes within a specified travel route for the vehicle, the at least some of the plurality of traffic lanes including the traffic lane in which the vehicle is traveling;
    means for at least one of data input and data output;
    means for storing data;
    a means for evaluating the at least some of the plurality of traffic lanes using at least one specified evaluation criterion, the position information of the vehicle, and the ascertained traffic situation; and
    a means for determining, based upon the evaluation, a lane having a shortest travel time, wherein unnecessary lane changes are avoided.

16. The system as recited in claim 15, wherein the means for ascertaining the position information obtain data for the ascertaining of the position information from at least one of a global positioning system, a measuring loop installed in the vicinity of the plurality of traffic lanes, and electronic maps.

17. The system as recited in claim 15, wherein the means for ascertaining the traffic situation obtain data for the ascertaining of the traffic situation from at least one of a master traffic control station, an intelligent distance regulating cruise control system, a vehicle-to-vehicle communications system, and a video monitoring system.

18. The system as recited in claim 15, wherein the means for at least one of data input and data output have at least one interface for: a) vehicle-to-vehicle communications; b) data exchange with at least one of a global positioning system and a master traffic control station; c) sensors; d) at least one of an acoustical data input, an acoustical data output, an optical data input, and an optical data output; and e) at least one of manual data input.

19. The system as recited in claim 18, wherein the system is coupled to a vehicle navigation system.

20. The system as recited in claim 18, wherein the system includes an on-board computer.

21. A computer system for guiding a vehicle, comprising:
- a means for ascertaining a position information regarding the vehicle, wherein the position information includes identification of a traffic lane in which the vehicle is traveling among a plurality of traffic lanes on a road;
- a means for ascertaining a traffic situation for at least some of the plurality of traffic lanes within a specified travel route for the vehicle, the at least some of the plurality of traffic lanes including the traffic lane in which the vehicle is traveling;
- means for at least one of data input and data output;
- means for storing data;
- a means for evaluating the at least some of the plurality of traffic lanes using at least one specified evaluation criterion, the position information of the vehicle, and the ascertained traffic situation; and
- a means for determining, based upon the evaluation, a lane having a shortest travel time, wherein unnecessary lane changes are avoided.

22. A computer-readable storage medium storing a computer program that, when executed by a computer, carries out a method for automated guidance of a vehicle, the method comprising:
- ascertaining a position information regarding the vehicle, wherein the position information includes identification of a traffic lane in which the vehicle is traveling among a plurality of traffic lanes on a road;
- ascertaining a traffic situation for at least some of the plurality of traffic lanes within a specified travel route for the vehicle, the at least some of the plurality of traffic lanes including the traffic lane in which the vehicle is traveling;
- evaluating the at least some of the plurality of traffic lanes using at least one specified evaluation criterion, the position information of the vehicle, and the ascertained traffic situation; and
- determining, based upon the evaluation, a lane having a shortest travel time, wherein unnecessary lane changes are avoided.

* * * * *